US008206793B2

(12) United States Patent
Greer et al.

(10) Patent No.: US 8,206,793 B2
(45) Date of Patent: Jun. 26, 2012

(54) ENHANCED PROJECTION SCREEN

(75) Inventors: Josh Greer, Beverly Hills, CA (US); Mel Siegel, Pittsburgh, PA (US); Lenny Lipton, Los Angeles, CA (US); Matt Cowan, Bloomingdale (CA)

(73) Assignee: RealD Inc., Beverly Hills, CA (US)

( * ) Notice: Subject to any disclaimer, the term of this patent is extended or adjusted under 35 U.S.C. 154(b) by 1025 days.

(21) Appl. No.: 12/079,460

(22) Filed: Mar. 26, 2008

(65) Prior Publication Data

US 2009/0246404 A1    Oct. 1, 2009

(51) Int. Cl.
*G11B 5/00* (2006.01)
*H01F 13/00* (2006.01)
*G03B 21/56* (2006.01)
*G03B 21/60* (2006.01)

(52) U.S. Cl. ........ 427/457; 427/130; 427/547; 427/550; 427/598; 359/443; 359/452; 359/453

(58) Field of Classification Search .................... 427/130
See application file for complete search history.

(56) References Cited

U.S. PATENT DOCUMENTS

| | | | | |
|---|---|---|---|---|
| 2,366,761 | A * | 1/1945 | Walker | 359/443 |
| 2,584,441 | A * | 2/1952 | Fredendall | 359/453 |
| 3,486,449 | A * | 12/1969 | Levine | 101/487 |
| 3,879,754 | A * | 4/1975 | Ballinger | 346/74.3 |
| 4,001,463 | A * | 1/1977 | Schaefer et al. | 427/599 |
| 4,434,663 | A * | 3/1984 | Peterson et al. | 73/643 |
| 6,189,804 | B1 * | 2/2001 | Vetter et al. | 239/7 |
| 6,773,765 | B1 * | 8/2004 | Gambino et al. | 427/599 |
| 2007/0195406 | A1 * | 8/2007 | Wood | 359/459 |

FOREIGN PATENT DOCUMENTS

JP    06-313124    * 11/1994
JP    2005107011    * 4/2005

* cited by examiner

*Primary Examiner* — Timothy Meeks
*Assistant Examiner* — Mandy Louie
(74) *Attorney, Agent, or Firm* — Baker & McKenzie LLP

(57) ABSTRACT

An apparatus and method for producing a screen is provided. The method includes propelling a quantity of paint comprising metallic flakes, such as aluminum flakes, toward the screen. The method also includes applying at least one magnetic field in a vicinity of the screen, wherein applying the at least one magnetic field causes at least one metallic flake in the quantity of paint to be oriented relative to the screen in a substantially preferred orientation, thereby producing a screen exhibiting beneficial projection qualities, such as brightness. The magnetic field(s) applied may be unsymmetric in the time domain of, for example, an AC component of the magnetic field.

17 Claims, 4 Drawing Sheets

ENHANCED PROJECTION SCREEN

BACKGROUND OF THE INVENTION

1. Field of the Invention

The present invention relates generally to the art of motion picture projection screens, and more particularly to screens having high gain and conservation of polarization for good 3D stereoscopic viewing over a broad viewing angle range created using electromagnetic fields to orient aluminum flakes.

2. Description of the Related Art

The motion picture industry, like many industries, is tradition-bound and technical innovation tends to come from the outside. There are numerous examples of this, such as the introduction of sound, color, widescreen, and 3D. Any change to the existing motion picture infrastructure has to be carefully measured in terms of its economic benefits compared with established industry methods. For any innovation to prevail, the innovation should cooperate with the existing infrastructure by making relatively incremental changes to industry methods.

Certain established methods of manufacture of motion picture screens exist, and as important, specifications and methods exist that must be followed in the motion picture theater in order to obtain the exhibitors' acceptance. Although there are good reasons for exhibitor acceptance of improved motion picture screens, ongoing concerns remain, such as sound system requirements, the ability to clean the screen, the cost of the screen, the means for hanging or installing the screen, and a host of other considerations, not the least of which is the image quality of the screen for both two dimensional and three dimensional (2D and 3D) projection. Motion picture screens preferably have high contrast, an unobtrusive surface, and even illumination across the screen surface viewed from any seat in the house.

Of particular concern in projecting stereoscopic motion pictures is the conservation of polarization. Screens that conserve polarized light frequently have a metallically reflecting surface, which can include non-metal reflectors that behave like metals. Such metallically reflecting surfaces typically include painted aluminum. The properties of that aluminum surface are to a large extent determined not only by the particle size of the aluminum pigment, but also the binder used, and the method of application. Of particular concern in projection of stereoscopic images is that the screen preserves the polarization for stereoscopic image selection. If depolarization occurs, the result will be crosstalk, wherein a portion of the unwanted perspective view is observed by each eye of a user. Crosstalk is undesirable, and detracts from the enjoyment of the stereoscopic movie by reducing the depth effect and causing viewer fatigue.

Certain screen designs employ a lenticular structure for increasing what is termed "screen gain." In many circumstances, some screen gain is desirable. Estimates are that only one-third of the volume in space in front of a projection screen contains seating, meaning two-thirds of the projected light is wasted or unavailable for the aggregate eyes of the audience. Note that a motion picture screen cannot amplify light, but can only reflect light projected onto the screen.

The more diffusing the surface of the screen, the more uniform the intensity of reflected illumination as a function of angle. Such a screen, in this instance generally referred to as a "Lambertian" screen, is described as a screen with a matte surface, and a perfect matte screen for the purposes of this discussion can be described as one having a gain of 1.0. Such a screen has many advantages, not the least of which is that the screen provides even, enhanced illumination to any seat in the house. In other words, even if an audience member is sitting far to the side, the brightness of the screen remains constant more or less over the entire surface of the screen. A screen with a gain of 1.0 means that every audience member sees an image having the same brightness. However, a screen with a gain of 1.0 wastes a significant amount of light reflected to the ceiling, floor, and sides of the auditorium. A screen with a gain of 1.0 may be desirable, especially for a wide auditorium or one with a balcony or balconies, but for most current theater designs a significant amount of light energy is wasted.

In general, Lambertian screens receive light and scatter light such that the brightness of the surface viewed by an observer is the same regardless of the observer's angle of view. Specular screens are screens which reflect light energy but can be done without equal brightness regardless of angle of view. A perfect specular screen or surface is a mirror.

Theater screens tend to be specular in nature to at least some degree. For a theater screen, light is gathered in the horizontal and reflected toward the seats in the audience where the light is needed. Side light which would be wasted is gathered and reflected to a more appropriate area of the theater, where people are seated. In general, theater screens having a gain much higher than 2.0 may result in hot-spotting. The ultimate hot spot results with a specular screen that is a mirror, exhibiting a very small hot spot.

Screens have been designed that are semi-specular with an eye toward reducing the hot spot. Theater screens are typically curved in a manner designed to make all parts of the screen substantially perpendicular to the viewing audience. Perfect perpendicular geometries cannot be realized, but are approximated by creating virtual curvatures using ribs or lenticules. Ribs or lenticules provide curvature and creating a beneficial viewing effect by shaping the bidirectional reflectance distribution function of the screen. Hot-spotting on a theater screen can be mitigated through screen cylindrical curvature, usually as a concave surface facing the audience.

One screen exhibiting strong gain, conservation of polarization, and spreading the light over well defined angle characteristics is the design used to produce the Kodak Ektalite screen of Chandler. The screen had an apparently unintended benefit of having excellent polarization conservation characteristics. The Kodak Ektalite screen, now out of production, was a concave screen, the inside section of a sphere. The screen had the rectangular shape as required for motion picture and slide projection and was a rigid solid screen, having an aluminum foil coating applied to its concave surface. The aluminum foil coating had a bark-like texture, which served to soften the specular nature of the reflections. The Kodak Ektalite screen had extremely high gain. Radius of curvature of the Ektalite screen was approximately 4.5 times the width of the front surface of the screen.

Problems exist with respect to the Kodak Ektalite-type screen since a solid screen has to be built in place in the theater. Using a Kodak Ektalite-type screen in a theater would significantly depart from exhibitors' current practices. Current screens are relatively easy to ship and assemble. They are rolled into a cylinder, like a rug, for shipment and assembled on a frame with cords attached to the frame pulling on the screen's grommets. The Chandler Kodak Ektalite design generally must be assembled from sections, or installed using some such technique that significantly departs from currently accepted theater screen implementation practice.

In addition, significant issues exist with a solid screen due to speaker placement issues. One of the important practices in the art of motion picture projection is to use a perforated screen, i.e. a screen with a regular pattern of small holes.

Loudspeakers are placed behind the screen containing the perforations, allowing sound to pass through the screen. This arrangement gives the audience the sensation that the sound is located in the same direction as the projected image. Theater owners have concerns over a non-perforated screen, as placement of speakers in other locations is perceived to compromise the audience perception of directionality of sound.

A key to the functioning of a polarization-conserving high gain motion picture projection screen is to suitably control the application of the coating to the underlying substrate surface. The reflecting surface itself is the functional part of the screen.

A modern so-called "silver" screen uses aluminum paint coated or painted onto a vinyl surface. The paint or coating material consists of small aluminum flakes held in place by a binder material. One issue with such a design is the random orientation of the flakes, wherein light striking the flakes and the surface is directed in random directions thus exhibiting a drop in gain.

Based on the foregoing, it would be beneficial to provide a design that provides enhancements over screens previously offered. Such a screen must conform to theater owner requirements and preferably exhibit good gain characteristics.

SUMMARY OF THE INVENTION

According to one aspect of the present design, there is provided a method comprising propelling a quantity of paint comprising metallic flakes, such as aluminum flakes, toward the screen. The method also includes applying at least one magnetic field in a vicinity of the screen, wherein applying the at least one magnetic field causes at least one metallic flake in the quantity of paint to be oriented relative to the screen in a substantially preferred orientation, thereby producing a screen exhibiting beneficial projection qualities, such as brightness. The magnetic field(s) applied may be unsymmetric in the time domain of, for example, an AC component of the magnetic field.

According to a second aspect of the present design, there is provided a screen fabrication system comprising a screen, a painting device, a quantity of paint comprising metallic flakes, configured to be propelled by the painting device toward the screen, and means for producing an orienting magnetic field, wherein the orienting magnetic field causes at least one metallic flake of the paint to be oriented in a substantially preferred orientation.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

This disclosure describes means for optimizing the orientation of the aluminum flakes to correspond with the best possible speciation for stereoscopic projection using the polarization method for image selection. The means for such an orientation is the proper application of an electromagnetic field.

According to the present design, a magnetic field or fields may be applied while spraying paint or binder comprising metallic flakes, or after spraying but before the paint or binder has set, or both. The magnetic field or fields has two components, a steady (DC) component that defines the direction of ultimate orientation of at least one flake, and a time-varying (AC) component that creates a "handle" on the flake that enables the DC component to orient the flake. An unsymmetric waveform may be applied, where the unsymmetric waveform is unsymmetric in the time domain of the AC component. The asymmetry provides directionality to the orientation, and without the asymmetry, the AC component may disorient rather than orient the flakes. Alignment can occur after the flakes and binder have been sprayed and contacted the screen but before the binder has set.

Figure 1:
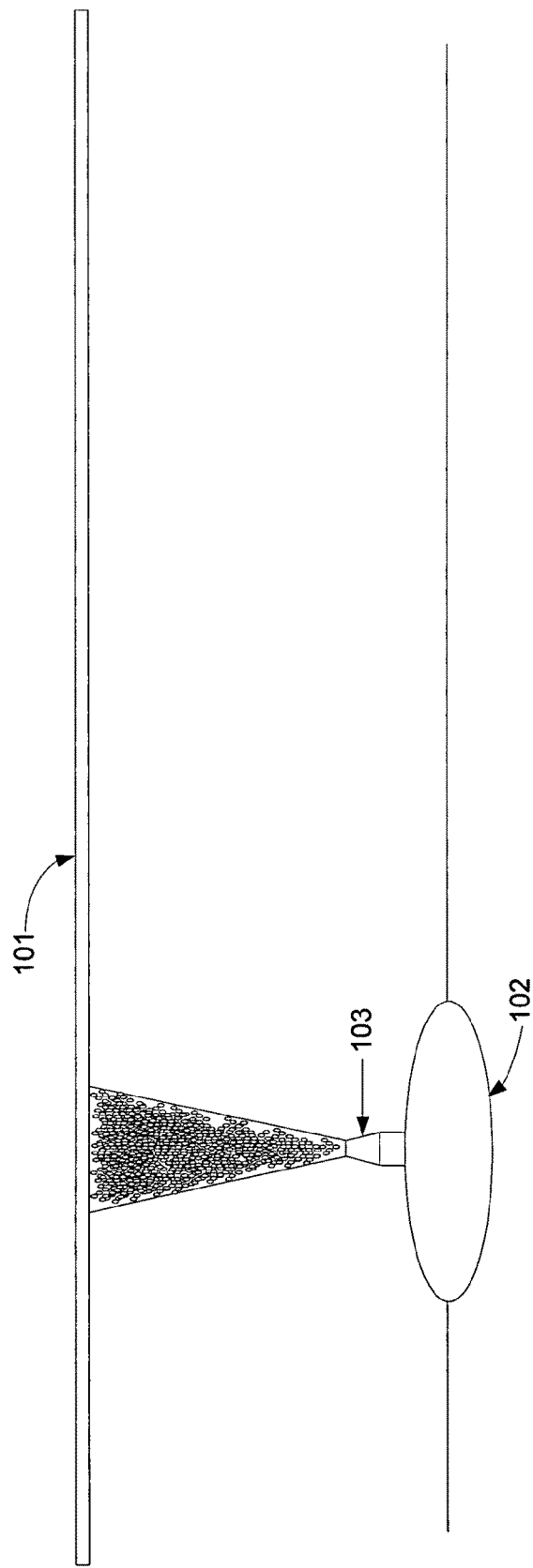
FIG. 1 illustrates components previously employed in painting a theater screen.
Figure 2:
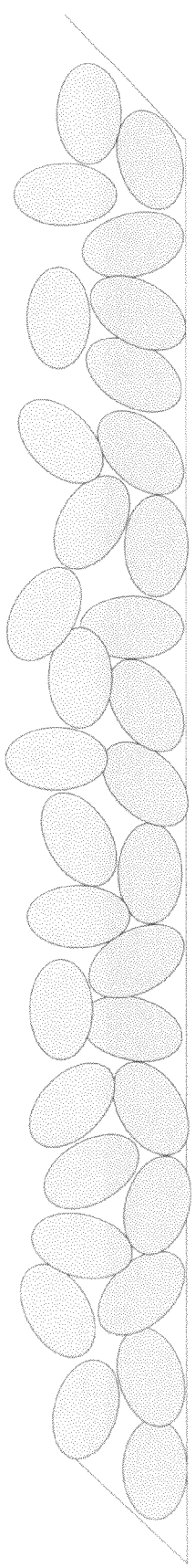
FIG. 2 is a representation of flake orientation on previous screens.

FIG. 1 illustrates one example of a design employed to apply paint or binder, such as aluminum based "silver screen" paint or binder, or some similar material to a screen. Painted screens typically employed in a theater are frequently on the order of tens or even over one hundred feet wide and tens of feet high. Screen 101 sits before an application drum 102 typically having a spray nozzle 103. The application drum may be affixed to a moving cart or wheeled arrangement or may travel along a line as shown in FIG. 1 or in some other manner generally known to those skilled in the art. Paint is propelled from the spray nozzle by applying pressure to the paint in the application drum 102, and paint travels through the air toward the screen and adheres to the screen in a generally random arrangement, drying in such a manner as is shown in FIG. 2. Note that representative paint drops are shown in FIG. 1, and those paint drops are not to scale nor is the quantity nor shape representative of actual paint drops. The spray nozzle 103 is generally designed to inhibit clogging and is known to those skilled in the art of screen fabrication and preparation. The properties of the paint are such that the paint is sprayed in a wet or viscous state and contacts the screen 101 in a slightly dried state and subsequently dries in a random flake arrangement similar to that shown in FIG. 2. Conditions within the spraying environment are such that drying of the paint can occur quickly and the paint does not run excessively, if at all. Tuning of the constitution of the paint and the distance between the spray nozzle 103 and the screen 101 may occur such that the paint does not run excessively nor dry to an excessive degree before contacting the screen 101, but instead is partially or substantially dry when the paint contacts the screen.

The illustration of FIG. 1 illustrates a relatively large loading of flakes-in-binder. Nothing in the drawings is intended to imply a size restriction or requirement, and the drawings are not to scale, but merely potential representations of one possible embodiment of the design. In actuality, flakes may be provided in much smaller quantities when applied to the screen, in that a small quantity of flakes may be applied at any given time. FIG. 1 is not intended to indicate that thousands or millions of flakes are propelled toward the screen at any given time, but instead, a small quantity of flakes in binder may be propelled toward the screen using any appropriate propelling mechanism, including spray device or other application device.

What has been noted is that the paint used to typically paint silver theater screens has a metallic composition, typically including aluminum or other metallic substance. Further, while the random pattern of flakes such as those shown in FIG. 2 tend to reflect light received, they tend to do so randomly and in some cases non-uniformly. A better arrangement is the one provided in the present application, namely having the flakes substantially aligned in a direction such that light coming toward the screen is uniformly reflected in a desired direction. Such a design can provide enhanced brightness and certain other beneficial viewing characteristics.

Figure 3:
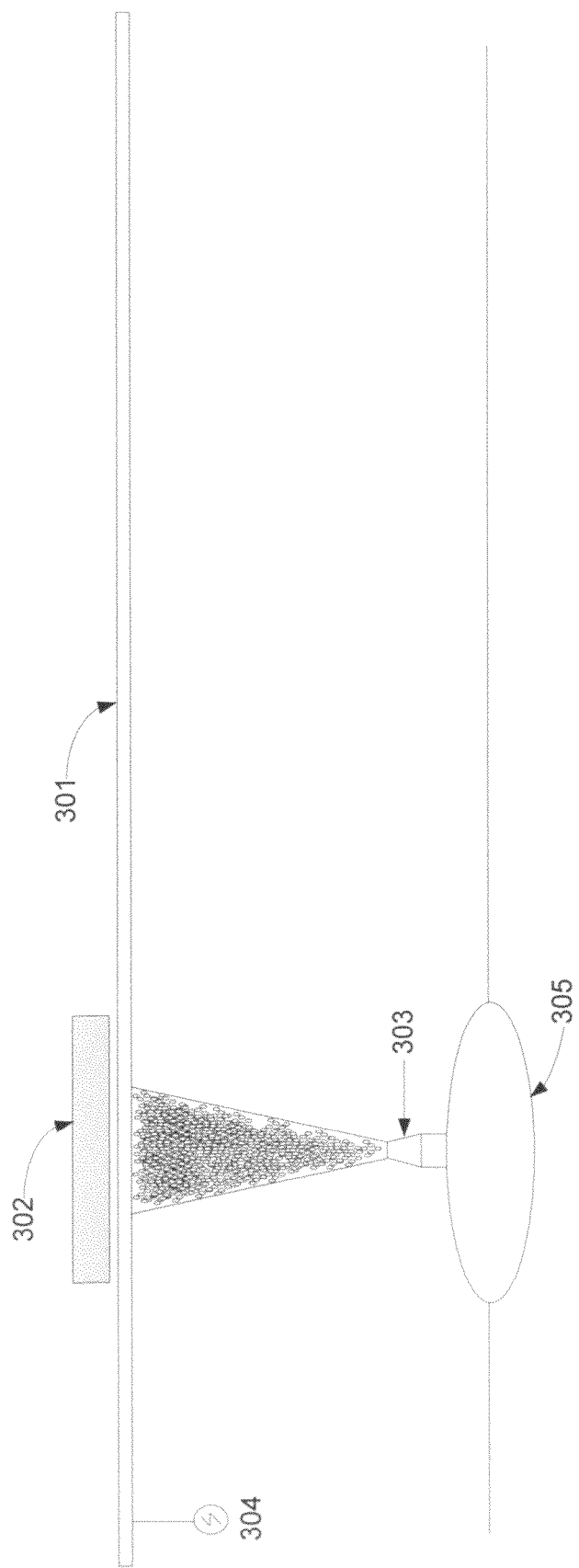
FIG. 3 shows components employed in the present design, including one aspect of a plate being provided proximate the screen and producing a magnetic field.

FIG. 3 illustrates one aspect of the present design. While only exemplary, the intent of the current design is to apply a magnetic field to the screen such that the flakes, when they contact the screen 301, are positioned in an aligned manner aligned based on the applied magnetic field. While the magnetic field may be provided in any number of ways, such as attached or applied directly to the screen 301, or provided by a magnetic field applied at or behind the screen, or in some other manner, the desire is to provide a magnetic-orientation to a set of metallic, magnetic flakes as they contact the screen 301.

Note that as used herein, the term "flake" or "flakes" takes on different meaning depending on the point in the process of propelling the paint toward the screen. In its viscous state, certain quantities of aluminum are present in a binder material in a typical "silver screen" aluminum based paint. These quantities of aluminum are referred to as "flakes." When in the viscous state, these "flakes" remain solid while the binding solution tends to dry. Once the paint contacts the screen, the binding solution has substantially dried, leaving a solid flake that may comprise the metal components and possibly dried binding material coated to at least a part of the outside of an aluminum or metal component. This dried component is also referred to as a "flake," even though it may comprise the solid aluminum previously called a "flake" and dried binding material. The term "flake" will be used throughout with this understanding, and the use of the term is not intended to be limiting. The present design seeks to have substantially aligned flakes bind to the screen.

The present design employs at least one magnetic field, described in further detail below. As may be appreciated, application of a magnetic field when the paint is sprayed and contacts the screen 301 in a wet form will not produce the aligned flakes desired, nor will application of a magnetic field after the paint has contacted the screen in a substantially dry state. Thus a fine balance between spraying the paint toward the screen and the paint drying on the way to the screen and in time for a magnetic force or field to be effective is employed, and it is understood that one skilled in the art will have an ability to strike an appropriate balance with some level of fine tuning.

FIG. 3 illustrates a magnetic field being applied by a plate 302 located behind screen 301, wherein paint is sprayed from application drum 305 via nozzle 303 toward screen 301 and partially dries during the spraying process, i.e. when travelling through the air from the nozzle 303 toward screen 301. The result is a partially dried flake or series of flakes that approach screen 301 and are impacted by the magnetic field to be oriented in a specific direction and contact the screen and adhere to the screen at the desired direction, substantially in alignment with other flakes on the screen.

Two magnetic fields may be applied, as discussed below, the first being applied to induce eddy currents in the paint drops sprayed toward the screen 301, and the second to effectuate a preferred orientation, such as aligned, when the paint contacts the screen 301. The magnetic field or fields may be applied in any reasonable manner, including direct application to the screen or proximate or in the vicinity of the screen. Further, the magnetic field need not be applied to the entire screen 301 at all times during spraying or propelling of paint, but rather only in the region being painted. Application of magnetic fields may be accomplished by electromagnet, application of current and voltage, or other reasonable ways to the screen or in the vicinity of the screen. Electrical connection 304 is shown in FIG. 3, but any device that can produce a magnetic field as described herein may be employed. Note that the DC and AC fields are typically components of a single magnetic field rather than as two separate fields, even when DC and AC fields are generated by separate pieces of the apparatus.

Figure 4:
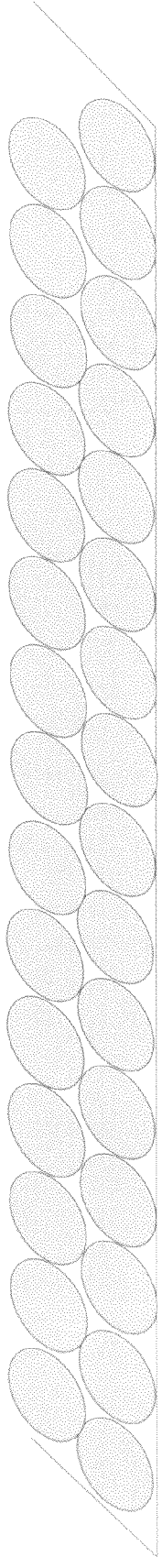
FIG. 4 is a representation of flake orientation on the current screen.

A depiction of the surface with flakes substantially aligned is presented in FIG. 4. From FIG. 4, while certain flakes 401 have different sizes, all flakes are substantially oriented in a particular direction. The result is a screen that better reflects light and incurs less loss before being viewed by a viewer sitting in the theater audience. Reflection is optimized locally to provide the desired directionality, making the reflection substantially equivalent to the curved screen described previously.

Magnetic Field(s)

The magnetic field components for the present design are such that they can rotate a flake or a flake inside drying paint in a desired orientation, such as in alignment or substantial alignment with other flakes. As noted, typical silver screen paint contains aluminum, comprising small flakes held in place by a binder material typically in liquid form. The present design optimizes the orientation of the aluminum flakes to correspond with the best possible speciation for stereoscopic projection using the polarization method for image selection.

Figure 5:
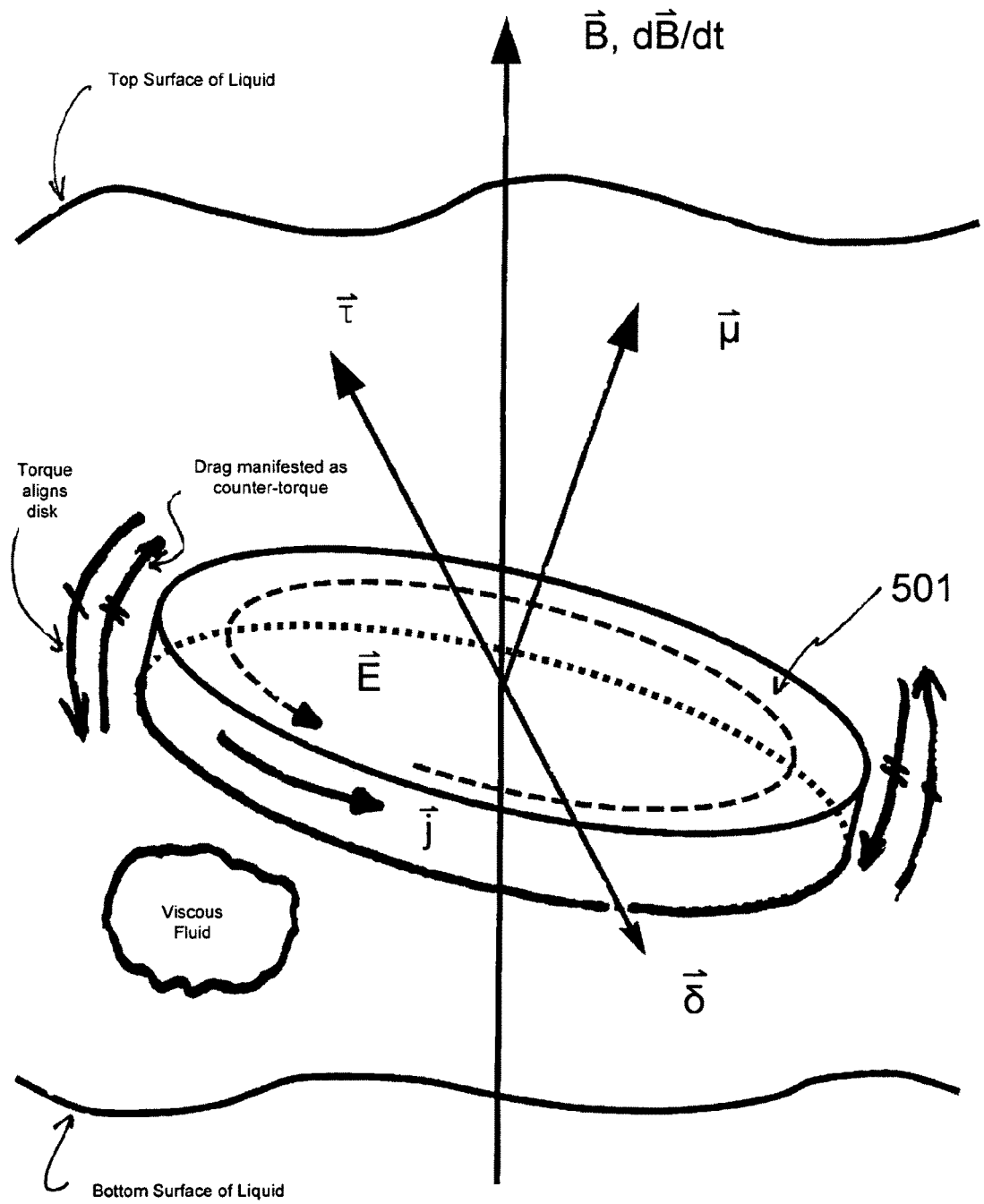
FIG. 5 shows a representation of a metallic flake as an ideal disc in a binding solution for the purposes of discussing the magnetic field(s) employed in the present design.

As may be appreciated, a flake of aluminum within a viscous binding material being projected or sprayed toward a screen and drying during the projection or spraying can be thought of as a metal disc 501 suspended in a viscous solution, such as is shown in FIG. 5. The magnetic field's effects on the disc can influence the orientation of the disc, and hence the ability of the magnetic field to orient the flake is of particular concern.

The disc 501 is therefore suspended in a viscous liquid. The AC-component of the magnetic field induces a current-loop in the disc 501. The current loop's interaction with the DC-component of the magnetic field is manifest as a torque that tends to rotate the disc's axis into alignment with the field.

The present design uses a magnetic field, such as an alternating current (AC) magnetic field, to induce an eddy current, and hence a magnetic dipole moment, in the disk, and typically a different magnetic field, such as a direct current (DC) magnetic field, to orient the magnetic moment. The torque exerted on the disk is represented by the combined AC and DC magnetic fields, in addition to the torque due to the viscous drag of the liquid in which the disk is suspended. The torque associated with the viscous drag of the liquid is proportional to the alignment speed of the disk.

In the present design, the torque exerted by the combined AC and DC magnetic fields, the viscous drag torque as a function of the rotating disk's angular velocity, and thus the time required to rotate the disk by 45 degrees, the average initially random misalignment, result in the ability for the flake to be reoriented and attach or bind in a preferred alignment to the screen.

With respect to induced eddy current, the integral form of one of Maxwell's Equations is:

$$dB/dt = \text{curl } E \tag{1}$$

where B is magnetic field in tesla=volts*m$^{-2}$, t is time, and E is electric field in volt/m. The integral of dB/dt over a surface element is equal to the integral of E around the boundary of the surface element.

For simplicity, throughout this discussion, we do not typographically distinguish scalar and vector quantities, the magnetic field B, electric field E, magnetic moment Mu ($\mu$), and torque Tau ($\tau$), as these quantities are understood by readers skilled in the art to be vector quantities. Similarly, the dot product of two vector quantities is understood to yield a scalar result, and the cross product of two vector quantities is understood to yield a tensor result that for practical purposes can be treated as a vector.

For an AC magnetic field, dB/dt is equal to $\omega_{AC}*B$ where $\omega_{AC}$ is $2\pi$ multiplied by the AC frequency. So for a circle, representing a circular ideal disk, of radius r:

$$\pi r^2 * \omega_{AC} * B_{AC} = 2\pi r * E \tag{2}$$

Units are volts on both sides of Equation (2). The subscript AC is added to $B_{AC}$ to distinguish it from the DC magnetic field $B_{DC}$ introduced later to characterize the field imposed to rotate the magnetic moment associated with the eddy current.

The microscopic form of Ohm's Law (I=V/R) is:

$$j = \sigma * E \tag{3}$$

where j is current density in ampere*m$^{-2}$ and $\sigma$ is conductivity in (ohm-m)$^{-1}$. Substituting into Equation (2) provides:

$$j = (½) * \omega_{AC} * B_{AC} * \sigma * r \tag{4}$$

Units for Equation (4) are ampere*m$^{-2}$.

With respect to torque, energy and torque have the same dimensions (force*distance), and are closely related descriptors of the interaction between magnetic moment and magnetic field. Scalar energy is the dot product $\mu \cdot B$ and torque is the vector cross product $\mu \times B$. Thus dimensionally $\mu$ is composed of the product of the current in a loop and the area enclosed by the loop. For a differential element of a disk between radius r and r+dr the differential torque is:

$$d\tau_M = (j*h*dr) * (\pi r^2) * B_{DC} \tag{5}$$

Dimensions for Equation (5) are kg*m$^2$*s$^{-2}$. The subscript M on $\tau_M$ denotes that this is the torque due to magnetic effects. h is the disk thickness, (j*h*dr) is the differential current in the loop, ($\pi r^2$) is the loop area, and $B_{DC}$ the imposed DC magnetic field. Substituting Equation (4) for j into Equation (5) yields:

$$d\tau_M = (\pi/2) * \omega_{AC} * B_{AC} * B_{DC} * \sigma * h * r^3 * dr \tag{6}$$

Integrating to the radius R of the disk, the total torque is $$\tau_M = (\pi/8) * \omega_{AC} * B_{AC} * B_{DC} * \sigma * h * R^4 \tag{7}$$

Regarding the viscous drag opposing torque, the classic definition imagines a shallow pool of liquid with a solid flat plate floating thereon. The plate is imagined to be dragged along the surface, resisted by the shear forces in the liquid. The drag force is proportional to the plate velocity times its area (in contact with the liquid) divided by the thickness of the liquid. In real life applications, the pool is not shallow, and the body of interest is dragged through the volume of the liquid rather than skimmed across its surface. Thus the density of the liquid must be considered. The actual geometry of the dragged object, i.e., streamlined versus blunt, becomes very important. For a disk that is twirling on a diametric axis versus a disk spinning on a polar axis, based on the general theory and consideration of the dimensions that can reasonably be involved the viscous force can be estimated as:

$$F = k1(\eta * \rho * v^3 * R^3)^{1/2} \tag{8}$$

Dimensions are in newtons. k1 is a dimensionless constant that captures the geometry, $\eta$ is the dynamic viscosity coming from the "classic definition" above, measured as described in newtons*m$^{-2}$*m$^{-1}$*s*m, which reduces to kg*m$^{-1}$*s$^{-1}$, $\rho$ is the liquid density in kg*m$^{-3}$, v is the velocity in m*s$^{-1}$, and R is the disk radius in meters.

Computing torque requires another factor of R and more geometric parameters:

$$\tau_v = k2(\eta * \rho * v^3)^{1/2} * R^{5/2} \tag{9}$$

where the subscript V on $\tau_v$ is the torque due to viscous effects. Expressing v in terms of the mechanical angular velocity $\omega_{ME} = v/r$ gives:

$$\tau_v = k3 * (\eta * \rho * \omega_{ME}^3)^{1/2} * R^4 \tag{10}$$

This approach ignores the weight and the moment-of-inertia of the disk, with the assumption that these are negligible compared to the drag. Drag depends on the geometry of the disk but not its mass and mass distribution.

The magnetic torque that orients the disk 501 against a retarding viscous drag torque in a reasonable amount of time requires equating the right sides of Equation (7) for the magnetically-induced torque and Equation (10) for the drag:

$$\omega_{AC} * B_{AC} * B_{DC} * \sigma * h * R^4 = k4 * (\eta * \rho * \omega_{ME}^3)^{1/2} * R^4 \tag{11}$$

The result is that the disk radius essentially does not matter, as cancelling R$^4$ terms appear on both sides of Equation (11).

Solving for the mechanical angular velocity that can be expected in response to the magnetically-imposed torque provides:

$$\omega_{ME} = k5 * ((\omega_{AC} * B_{AC} * B_{DC} * \sigma * h) / (\eta * \rho)^{1/2})^{2/3} \tag{12}$$

For the materials employed and the variables provided in Equations (1) through (12), for aluminum, $\sigma = 3.8*10^7$ (ohm-m)$^{-1}$; for water, $\rho = 10^3$ kg*m$^{-3}$, $\eta = 10^{-3}$ kg*m$^{-1}$*s$^{-1}$ (at room temperature, 20 degrees C.).

In the present application, easily achieved DC or moderate frequency AC magnetic field strengths, are on the order of a small few hundred gauss, or a few times 10$^{-2}$ tesla, so the product $B_{AC}*B_{DC}$ is presumed to be on the order of 10$^{-3}$ tesla$^2$.

The actual value for this is estimated based on the flake parameters. By way of example and not limitation, h is estimated to be approximately 10$^{-6}$ m, i.e., one micron. For k5=1:

$$\omega_{ME} = 0.1 \, \omega_{AC}^{2/3} \text{ or } \tau_{45} = 0.37 f_{AC}^{-2/3} \tag{13}$$

where $\tau_{45}$ is an estimate of the alignment time (assumed 45 degrees of a 360 degree mechanical cycle) and $f_{AC}$ is the AC frequency. For a frequency in the 10 kHz regime, Equation (13) gives an alignment time in the millisecond range.

If the flakes are in the 100 Angstrom (10$^{-2}$ micron) thickness range, alignment time increases to the 20 millisecond range. If a fast drying solvent is employed, such a solvent would probably have a lower viscosity than water, partly counterbalancing any concern over drying time. If the flakes are in the 100 micron thickness range, the foregoing suggests alignment time is in the 5 microsecond range. This value may alter any assumption that the torque required to overcome moment-of-inertia is negligible compared with the torque required to overcome drag, and may materially effect the time and magnetic field calculation.

Thus according to the present design, metal flakes are aligned in a liquid using a practical-size AC magnetic field to induce an eddy current and a practical-size DC magnetic field to rotate the corresponding magnetic dipole moment. The time scale for alignment for sensible-seeming numerical values of the material and physical variables is on the order of one millisecond for a typical or expected aluminum based silver paint. The magnetic torque of the flake in viscous binder material is counteracted primarily by viscous drag as opposed to the moment-of-inertia of the flake. The diameter of the flake tends to not affect the alignment time. However, the thickness (h) of the flake can affect alignment time as $h^{-2/3}$, so thinner flakes are aligned more slowly. Within reasonable limits this can be compensated by using a higher AC frequency when the flakes are thinner. However if carried to an extreme, consequent inductive heating of the flakes presents certain issues.

One additional consideration is the amount and type of electric field and magnetic field applied to disk 501. Again referring to FIG. 5, magnetic field B changes at rate dB/dt, where t represents time. The design induces tangentially-directed electric field E in plane of disk 501 (curl E=dB/dt). Electric field E drives the electric current of density j as follows:

$$j = \sigma * E \tag{14}$$

where σ is conductivity. Equation (14) is the microscopic form of Ohm's Law. Integral j throughout disk 501 generates magnetic moment μ perpendicular to disk 501:

$$\int d\mu = 2\pi * r * T * j(r) * dr \tag{15}$$

where r is the radius vector, T the thickness of disk 501, integrated in direction r×j, over the volume of the disk 501.

The interaction of μ with B produces torque on disk 501, where $$\tau = \mu \times B \tag{16}$$

The energy of orientation is μ·B. τ works to align the plane of disk perpendicular to B. Absent any drag, the angular velocity of disk at any t is proportional to integral of τ(t) over the duration of the interaction.

However, a viscous drag manifests as a counter-torque which dissipates the kinetic energy of the disk's rotation. Such kinetic energy is the result of the work done by the torque. The drag can be roughly approximated as a counter-torque proportional to the angular velocity of the disk's rotation. When the torque and counter-torque exactly balance, disk 501 moves at an angular velocity that depends on its instantaneous orientation via the dependence of the torque itself on instantaneous orientation.

The time to achieve alignment, or a specific partial alignment, is determined by the tension between the alignment accelerating torque in response to dB/dt and the alignment-decelerating drag determined by the viscosity of the fluid, the geometry of the disk, and the instantaneous angular velocity In general, it is not possible to maintain the desired dB/dt indefinitely. Beyond some point the underlying magnetic field B cannot practically continue to increase, and dB/dt must become zero. This might be, for example, because the electromagnet's current source reaches its limiting current.

One way to control B and dB/dt independently is to vary B cyclically. The structure of the cycle in the time domain provides the desired dB/dt at any desired mean value of B. In many applications a sinusoidal variation may be successfully employed. A sinusoidal variation permits recovering, during one half of the cycle, all or most of the energy that was deposited, for example as kinetic energy, during the other half of the cycle.

But in the present application sinusoidal variation, or any cyclic variation symmetric with respect to rise and fall, has certain undesirable aspects. Alignment motion achieved in one half of the cycle should not be reversed by the second half of the cycle. An unsymmetric cycle provides desirable improvements.

In the absence of a dissipative mechanism, such as drag, an unsymmetric cycle can be an inadequate solution. Energy delivered to the disk's mechanical motion during one half of the cycle is returned to the driving electrical circuit during the other half. So the viscous drag of the fluid in which the flakes are dispersed can be employed to achieve the desired static alignment.

Any unsymmetrical waveform may produce satisfactory results. The simplest option is a sawtooth waveform in which B increases linearly with time (dB/dt is constant) during one half of the cycle and B drops nearly instantaneously back to its starting value during the nearly instantaneous second half of the cycle.

During the rising part of the cycle B can increase without bound, so dB/dt could be constant. Parameters may be chosen according to the foregoing equations so that the duration of this rising part of the cycle is long enough for the disk 501 to be rotating at any instant at the angular velocity that corresponds to its instantaneous orientation. B then "snaps back" to its baseline value. In the absence of drag, the rotational energy of the disk returns to the field, reversing the alignment that had been achieved. But with drag, and the very large value of dB/dt implicit in the "snapping back" of the field, the only thing that can happen is for the energy transferred to the disk during the snap-back to be dissipated ohmically.

So with appropriate choice of operating parameters the energy delivered to the disk 501 during one half of the B-variation cycle is mechanical work that changes the alignment of the disk 501, whereas the energy delivered to the disk during the other half of the cycle is the electrical work that is manifest as ohmic heating of the disk. Heating in this scenario is at a rate such that the fluid does not boil, but achieves reasonable alignment without unreasonable heating.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for producing a screen, comprising:
providing a quantity of paint comprising metallic flakes to the screen;
employing an eddy inducing magnetic field configured to induce eddies in at least one metallic flake in the paint comprising metallic flakes; and
employing an orienting magnetic field configured to orient at least one metallic paint flake in the paint comprising metallic flakes on the screen in a substantially preferred orientation.

2. The method of claim 1, wherein the paint comprises aluminum flakes.

3. The method of claim 1, wherein the eddy inducing magnetic field is an alternating current electric field.

4. The method of claim 1, wherein the orienting magnetic field is a direct current electric field.

5. The method of claim 1, wherein said providing comprises propelling the quantity of paint from a distance from the screen sufficient to induce partial drying prior to substantial quantities of paint contacting the screen.

6. The method of claim 1, wherein said providing comprises propelling the quantity of paint using a spraying mechanism traversing substantially parallel to the screen from a distance from the screen sufficient to enable said orienting magnetic field to magnetically affect the paint.

7. The method of claim 1, wherein the substantially preferred orientation comprises a substantially aligned orientation.

8. The method of claim 1, wherein at least one magnetic field comprises an unsymmetrical waveform.

9. A method for producing a screen, comprising:
providing a quantity of paint comprising metallic flakes to the screen with a painting device;
applying a first magnetic field tending to induce eddy current in the metallic flakes in the paint provided to the screen; and
applying a second magnetic field causing the metallic flakes in the paint to be oriented in the substantially preferred orientation when the paint contacts the screen, wherein the substantially preferred orientation comprises a substantially aligned orientation.

10. The method of claim 9, wherein the paint comprising metallic flakes comprises aluminum.

11. The method of claim 9, wherein the first magnetic field comprises an alternating current magnetic field and the second magnetic field comprises a direct current magnetic field.

12. The method of claim 9, wherein said providing comprises propelling the quantity of paint from a distance from the screen sufficient to induce partial drying prior to substantial quantities of paint contacting the screen.

13. The method of claim 9, wherein said providing comprises propelling the quantity of paint using a spraying mechanism traversing substantially parallel to the screen from a distance from the screen sufficient to enable said magnetic field to magnetically affect the paint.

14. The method of claim 9, wherein at least one magnetic field comprises an unsymmetrical waveform.

15. The method of claim 9, wherein the painting device comprises a nozzle and an application drum.

16. The method of claim 15, wherein the painting device sprays the paint from the application drum via the nozzle towards the screen.

17. The method of claim 16, wherein the paint partially dries during the spraying process when traveling through the air from the nozzle towards the screen.

* * * * *